United States Patent [19]

Wurtz

[11] Patent Number: 4,708,268
[45] Date of Patent: Nov. 24, 1987

[54] METHOD AND APPARATUS FOR THE ACCURATE VOLUMETRIC FEEDING OF MATERIALS

[75] Inventor: William O. Wurtz, Paramus, N.J.

[73] Assignee: Willow Technology, Inc., Paramus, N.J.

[21] Appl. No.: 678,894

[22] Filed: Dec. 6, 1984

[51] Int. Cl.⁴ ............................................. G01F 11/20
[52] U.S. Cl. ..................................... 222/238; 222/241; 222/271; 222/333; 222/342; 222/413; 366/81; 366/157; 366/158; 366/186
[58] Field of Search ........ 222/310, 311, 564, 239–242, 222/410–413, 342, 238, 236, 272, 271, 280, 281, 333; 366/134, 156, 157, 158, 186, 271, 83, 84, 85, 81; 198/669, 662

[56] References Cited

U.S. PATENT DOCUMENTS

| | | | |
|---|---|---|---|
| 1,095,383 | 5/1914 | Cole | 222/238 |
| 1,786,556 | 12/1930 | Arnold et al. | 366/157 X |
| 2,478,079 | 8/1949 | Beasley et al. | 222/413 X |
| 2,576,177 | 11/1951 | Herr | 366/158 X |
| 2,991,870 | 7/1961 | Griffith et al. | 198/662 X |
| 3,421,740 | 1/1969 | Behrens | 366/186 |
| 3,482,821 | 12/1969 | Blackwood | 366/186 |
| 3,941,357 | 3/1976 | Wurtz | 366/91 |
| 4,335,964 | 6/1982 | Drake et al. | 222/239 |

Primary Examiner—Joseph J. Rolla
Assistant Examiner—David H. Bollinger
Attorney, Agent, or Firm—Collard, Roe & Galgano

[57] ABSTRACT

There is provided a method and apparatus for the accurate volumetric feeding of materials which require agitation to induce flow, the apparatus includes a hopper for containing said materials including a lower horizontally disposed, cylindrically shaped trough portion, an adjustably feed opening for feeding said material from said hopper disposed at a first end of said lower trough portion, a feeder assembly comprising a plurality of radially extending material working tools circumferentially mounted at equal angular displacements along a rotatable shaft and a feed helix longitudinally mounted on said shaft. The feeder assembly is disposed longitudinally in the lower trough portion and the shaft thereof defines the center of said trough portion. The material working tools are double wedge shaped having substantially triangularly shaped sides converging toward each other at their connection to the shaft and converging toward each other to define a forward or leading edge in the direction of rotation of the tool. The bottom surfaces of the tools are recessed from the bottom edges of the triangularly shaped sides.

7 Claims, 4 Drawing Figures

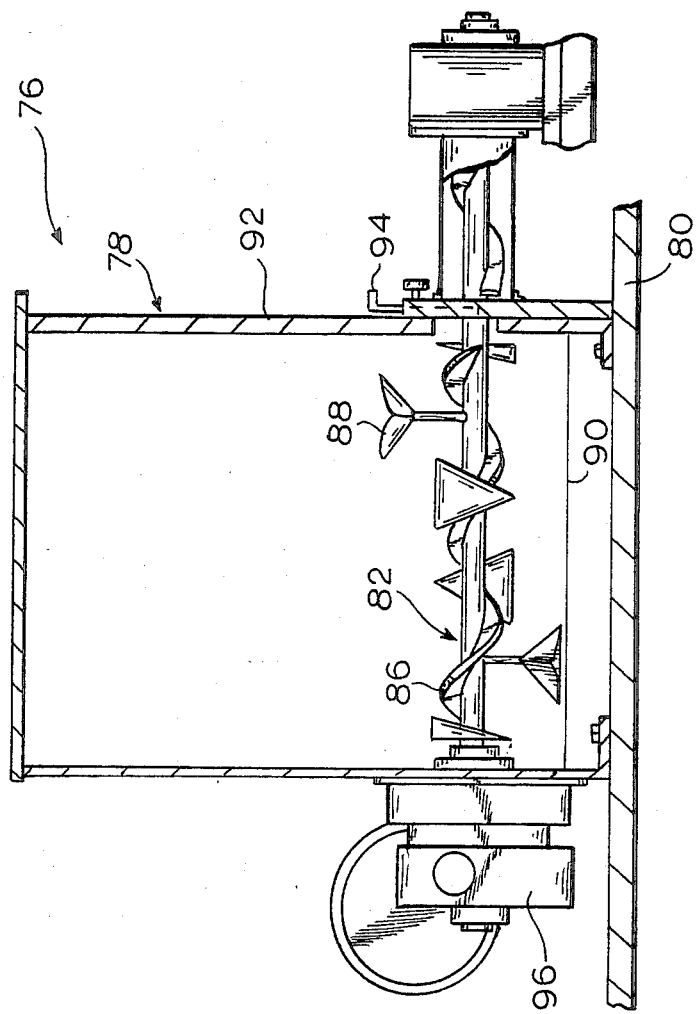

METHOD AND APPARATUS FOR THE ACCURATE VOLUMETRIC FEEDING OF MATERIALS

This is a continuation-in-part of U.S. Ser. No. 678,893, filed on even date herewith, entitled "METHOD AND APPARATUS FOR DISCHARGING MATERIALS FROM A STORAGE BIN", the disclosure of which is incorporated herein by reference.

The present invention relates to a method and apparatus for the accurate volumetric feeding of materials and, more particularly, the present invention relates to a method and apparatus for feeding with controlled volumetric and relative gravimetric accuracy substantially dry, free-flowing materials by mechanically inducing continuous, dependable flow of such materials in the feed hopper so as to accurately feed the material from the hopper.

Many dry, free-flowing materials can be fed with reasonable volumetric accuracy without hopper agitation by means of a simple helix driven by a variable speed drive. Such materials are non-cohesive, have a relatively uniform size and shape with relatively smooth surfaces. Examples of such materials are spherical plastic pellets, salt, sugar, etc. However, there are other materials that do require some hopper agitation in order to induce flow for feeding purposes which are not as free-flowing because of non-uniform particle size and shape, possible non-uniform density, slight cohesiveness, or otherwise free-flowing material which is slightly damp. Heretofore, feeders for feeding such described materials which require hopper agitation utilized rotating helices or paddles mounted above and parallel to the feed auger or augers or, alternatively, provided pulsating or vibrating hopper walls. Changes in the feed rate of such types of equipment are accomplished by increasing or decreasing the rotational speed of the feed augers by means of a variable speed drive thereby increasing or decreasing the conveying rate of the auger in terms of the volume of material delivered. A problem in the operation of such material feeders is that the feed auger conveys material from its rear end at the rear of the hopper and is generally filled from this end leaving the material towards the front of the auger relatively untouched. This often leads to compaction and non-movement of the material at the forward end of the auger near the feed outlet. Also, because of the necessary clearance between the peripheral edge of the auger and the container wall, material accumulates against the wall without movement, particularly if the material is compressible. Because of the upward thrust of the rotary agitators or the compacting action of the pulsating or vibrating hopper walls, the material is generally moved non-uniformly through the hopper. In my previously filed application, Ser. No. 678,893, entitled "METHOD AND APPARATUS FOR DISCHARGING MATERIALS FROM A STORAGE BIN" I describe apparatus which is used for discharging or feeding difficult-to-handle materials from a storage bin wherein the material is induced to flow toward a discharge opening by means of a feeder assembly comprising working tools mounted on a pair of horizontally disposed, parallel, counter-rotating shafts wherein the working tools are in the form of triangularly shaped wedges having their leading edges arranged in the direction of rotation of the respective shaft. In order to impart a force to the material to induce it to flow toward the discharge opening, the tools are provided with one side of the working tool disposed at an angle to move a greater amount of material than the other side of the working tool with all of such sides being arranged in the direction of desired material flow. In the case of the bin-discharger-feeder described in that application, additional discharger-mixer assemblies are arranged symmetrically above the feeder assembly, comprising the asymmetrical wedge shaped working tools, for the purpose of thoroughly mixing the material delivered to the feeder assembly. Such apparatus as described in this prior application are used with difficult-to-handle materials which are described to be dry materials or dry blends of materials that tend to classify in material-handling equipment by virtue of variations in particle size, shape or weight; damp or wet materials; fibrous materials; cohesive materials; sludge; composted materials with or without bulking agents; or heavy, viscous, shear sensitive, non-Newtonian materials with or without fillers or fibers. As pointed out in the application, the apparatus described therein is well suited for mechanically inducing continuous, dependable flow of such materials at fixed flow rates or at controlled, variable flow rates. The reason such apparatus is so well suited to discharge or feed such hard-to-handle materials is that it is adapted to impart conditions to such material which approach "mass flow" which is defined therein as having the following characteristics:

1. Material flow through the storage bin is uniform and at steady rate. Bridging, coring and classification of the material does not occur. The bulk density of the material is constant. Aerated powders should de-aerate;

2. Pressures are relatively low throughout the material mass and at the walls, thereby reducing compaction and attrition of the material;

3. Substantially uniform pressures exist across any horizontal cross section of the material;

4. Dead regions, where the material does not move, do not develop within the storage bin; and 5. First-in, first-out flow pattern is obtained which eliminates degradation due to retention and segregation of the material.

As indicated above, many dry, free-flowing materials can be fed with reasonable volumetric accuracy without hopper agitation by means of a simple variable drive helix. However, there is a range of materials between such free-flowing materials and the above described difficult-to-handle materials which require some type of agitation of the material in order to induce flow. Although the bin-discharger-feeder described in my prior application can be utilized for feeding such materials, such a machine would be over-designed for this application and therefore economically unsuited. At the present time, there are no commercially available dry material feeders utilizing helices to induce flow which promote "mass flow" in the feeder hopper as described above. Thus, such machines cannot feed materials with a high degree of volumetric or gravimetric accuracy.

Material feeders of the type contemplated by the present application are utilized in industry to accurately feed materials, for example, for the purpose of mixing such materials with other similarly fed materials in a mixing apparatus. The accuracy of such feeding depends on the specific requirements of the particular industry. In some situations, such as in the food or chemical industries, gravimetric accuracy is required. Gravimetric accuracy is defined as a given volume of material delivered over a period of time at a given density. Gravimetric feeders are very complex equipment which weigh the material delivered and, through complex controls, adjust the equipment as required to give the gravimetric accuracy desired. Such controls include microprocessor equipment and are very expensive. In certain situations, such gravimetric accuracy can be waived to a certain extent where the given density can be relatively uniform or other inaccuracies are allowable within certain acceptable limits. In such situations, a gravimetric feeder may be unnecessary. Also, in many industrial processes, it is required only that volumetric accuracy be delivered. Volumetric accuracy is the accurate delivery of a given volume of material over a period of time. In such a situation, it is relatively unnecessary for the density of the material to be uniform throughout the delivery. As indicated above, the material feeders available to industry today which operate with helices and some form of hopper agitation do not establish or promote "mass flow" in the feeder hopper and, therefore, are unable to deliver material with volumetric or gravimetric accuracy.

Ideally, in order to obtain volumetric accuracy in a material feeder as well as relative gravimetric accuracy, it is necessary that the material being fed pass through the feeder hopper under conditions approaching "mass flow" so that the material is fluidized to thus behave like and have flow characteristics similar to water. In such a case, the equation for flow in fluid mechanics, where the volume rate of flow equals the material velocity multiplied by the area through which the material passes, can be utilized to determine approximate flow rates. Thus, at constant velocity, a change in the area of the opening results in a directly proportional change in the volume flow rate. In addition, with a constant differential pressure across the opening, a change in the area of the opening produces a change in the volume rate of flow. Thus, the design parameters which must be met by a volumetric feeder must satisfy the conditions of "mass flow" of the material in the feed hopper in order for the feeder to feed material at high volumetric accuracy and gravimetric accuracy.

It is, therefore, a primary object of the present invention to provide a material feed apparatus for slightly cohesive, non-uniform particle size and shape, non-uniform density, or damp material which is otherwise free-flowing, which is economical and adapted to mechanically fluidize the material by establishing the conditions of material "mass flow" so that the material may be fed with volumetric accuracy and with greater gravimetric accuracy than heretofore possible with volumetric feeders.

The above object, as well as others which will hereinafter become apparent, is accomplished in accordance with the present invention by the provision of a volumetric material feeder comprising a hopper having a feed helix disposed on a horizontal rotating shaft for moving material to a feed opening in the hopper and means for fluidizing the material in the hopper. The means for fluidizing the material consists of a series of working tools disposed on the helix carrying shaft and may also include a series of similar working tools disposed on a shaft parallel to and elevated from the helix carrying shaft which rotates in a direction counter to the rotational direction of the helix carrying shaft with the working tools of the two shafts overlapping. The feed opening is controlled by an adjustable slide gate so that the area of the feed opening can be varied to adjust the volume rate of flow of material being fed.

According to the method of the present invention for the accurate volumetric feeding of materials consisting of dry materials of non-uniform particle size and shape, possible non-uniform density, slightly cohesive, or otherwise free-flowing material which is slightly damp, the steps comprise interacting the material in a container with working tools so that mechanical forces are applied through the working tools to fluidize the material and induce "mass flow" through the container by moving individual particles and layers of material in oblique directions, the forces and components exerted in directions circularly and laterally; radially inverting the individual particles of divided materials so as to change their direction, paths of travel and velocities so that the mechanical shear forces imparted by the working tools, as well as the hydraulic shear forces created by the particles slipping on each other by their different velocities, are averaged over an extremely short period of time; averaging and making uniform the shear stresses resulting from the mechanical and hydraulic shear forces for each particle whereby, as a result of the uniform work input, uniform temperature gradient if mechanical energy is converted to heat energy, uniform shear stress, a uniform and predictable viscosity, and a uniform bulk density results; and feeding the material from the container by a rotating helix which moves the material to an adjustable feed opening in the container.

Other objects and features of the present invention will become apparent from the following detailed description considered in connection with the accompanying drawings. It is to be understood, however, that the drawings are designed as an illustration only and not as a definition of the limits of the invention.

In the drawings wherein similar reference characters denote similar elements throughout the several views:

FIG. 4 is a side elevational view of another embodiment of the dry material feeder according to the present invention.

Figure 1:
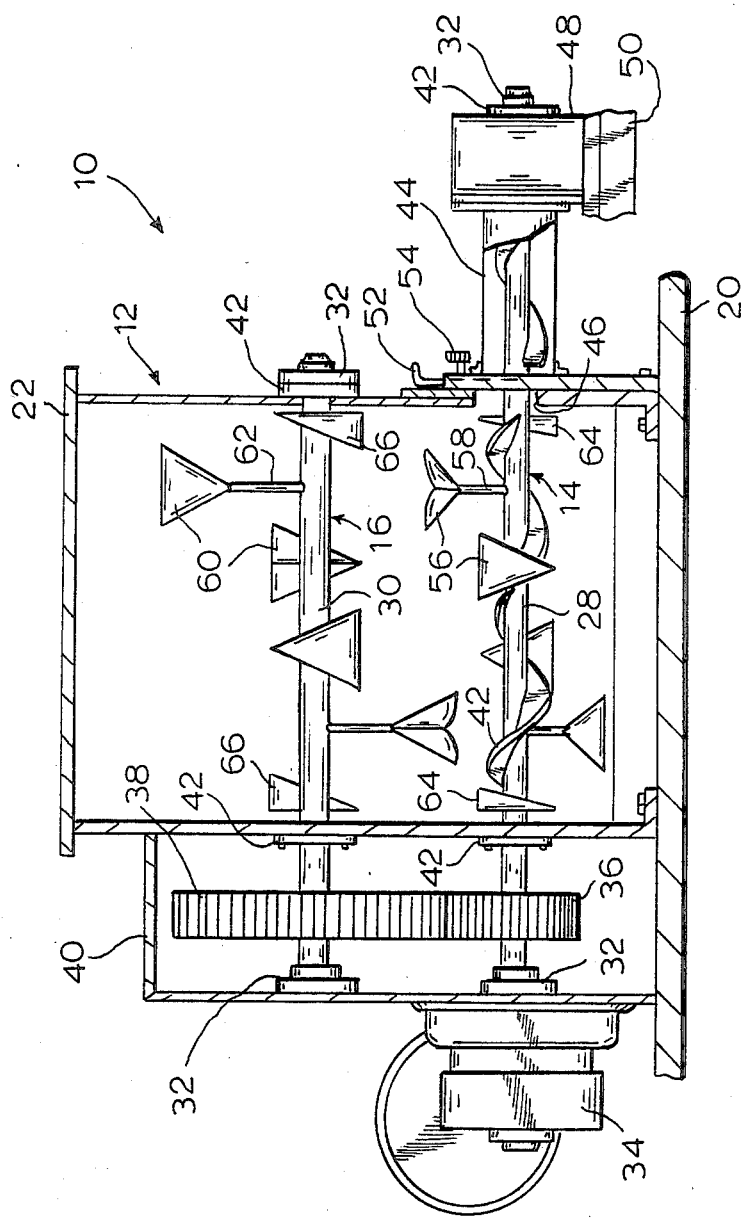
FIG. 1 is a side elevational view of a dry material feeder according to the present invention with a portion thereof broken away.

Now turning to the drawings, there is shown in FIG. 1 a volumetric material feeder, generally designated 10, comprising a container or hopper, designated 12, having disposed therein a feeder assembly 14 and an agitator assembly 16. Hopper 12 is mounted on a support structure or frame 18 (FIG. 2) which in turn is bolted or otherwise secured to the floor or base pad 20. The upper peripheral edge of hopper 12 is provided with a flange 22 which permits the securement of a cover (not shown) or a storage bin (not shown) thereto. As clearly seen in FIG. 2, hopper 12 consists of two vertically aligned, substantially cylindrically shaped, intersecting trough portions, designated 24 and 26.

Assemblies 14 and 16 are driven by horizontal, vertically spaced apart shafts 28 and 30, respectively, which are mounted for rotation in hopper 12 between bearings 32 and are driven counter-rotationally by means of gear motor 34 and spur gears 36 and 38 mounted in gear housing 40 adjacent to hopper 12. Packings are provided for shafts 28 and 30 in packing housings 42 where the shafts exit hopper 12. Shafts 28 and 30 are so disposed in hopper 12 as to define the centers of cylindrically shaped trough portions 24 and 26, respectively. Feeder assembly 14, as clearly seen in FIG. 1, is provided with a helix, designated 42, which is mounted to and extends along the length of shaft 28. An extension cylinder, designated 44, is secured to the front face of hopper 12 at a feed opening 46 therein and extends to downspout 48 which in turn is connected to a flexible connection 50 which may be connected to a material mixer (not shown). Feeder assembly 14, which includes helix 42 for feeding the material from hopper 12, extends through feed opening 46 and extension cylinder 44 to downspout 48. An adjustable slide gate, designated 52, is provided at feed opening 46 and is adjusted by means of adjustment bolt 54 having a knurled head for easy manipulation. Adjustable slide gate 52 is provided to adjust the extent of feed opening 46 and is shaped to form around shaft 28 at opening 46 where helix 42 is interrupted as it passes through the opening.

In addition to helix 42, feeder assembly 14 also includes a series of working tools, designated 56, which are circumferentially spaced around shaft 28 at equal angular displacements and are connected with the shaft by means of radially extending arms 58. Agitator assembly 16 is also provided with a series of working tools 60 connected to shaft 30 which correspond to the working tools carried by shaft 28 but are positioned 180° out of phase therewith. Working tools 60 are connected to shaft 30 by means of radially extending arms 62. At the ends of each shaft 28 and 30 within hopper 12 there are provided working tools 64 and 66, respectively, which are half wedge shaped to scrape the material from the interior front and rear walls of hopper 12 and propel material inwardly into the hopper. As clearly seen in FIG. 2, the diameter of cylindrically shaped trough portion 26 is twice the diameter of cylindrically shaped trough portion 24 and the respective working tools 60 and 56 extend substantially up to the inner surfaces of the walls of the respective trough portions. Spur gear 38 is provided with a diameter that is twice the size of spur gear 36 so that shaft 30 rotates at one-half the rotational speed of shaft 28 with a greater torque being applied by working tools 60 to the material in hopper 12. This arrangement also ensures that the working tools 56 and 60 are maintained 180° out of phase with each other.

Figure 3:
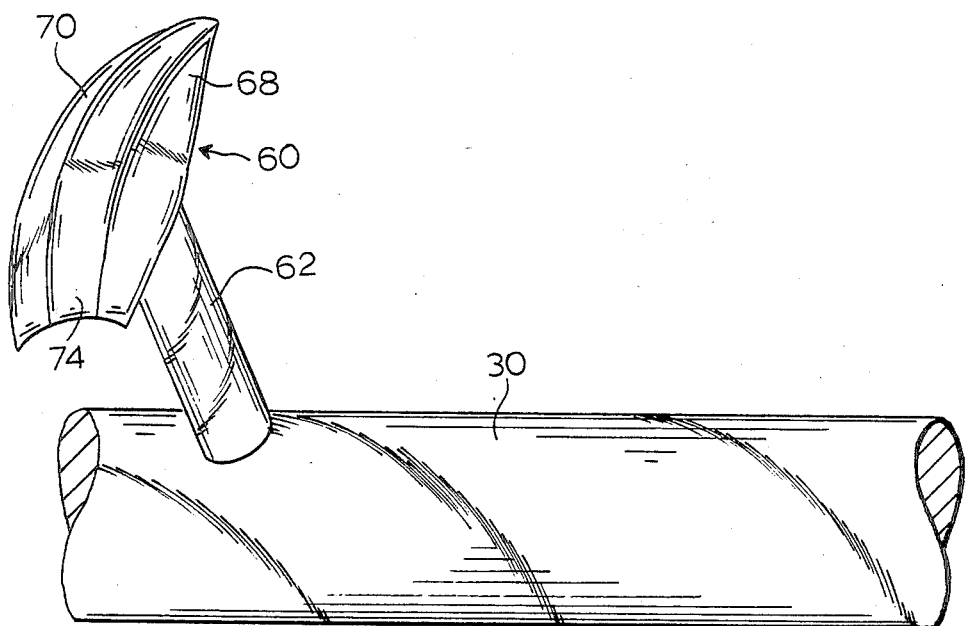
FIG. 3 is a perspective view of the working tools utilized in the dry material feeder according to the present invention.

Working tools 56 and 60 are similar in design and, as seen in FIG. 3 where working tools 60 are depicted, are essentially wedge shaped or triangularly shaped having substantially triangularly shaped sides, designated 68 and 70, which converge toward each other at their connection with connecting arm 62 and converge toward each other to define a forward or leading edge, designated 72. Forward edge 72 of tool 60 is arranged in the direction of rotational movement of the tool. The bottom surface of tool 60, designated 74, is recessed with respect to the bottom edges of triangularly shaped sides 68 and 70 and is substantially parallel to the internal surface or wall of trough 26. Likewise, with respect to working tool 56, the bottom surface thereof is also substantially parallel to the internal surface or wall of trough 24. Sufficient working tools 56 and 60 are provided on shafts 28 and 30, respectively, to sweep the complete inner surfaces of the respective troughs 24 and 26. The bottom surfaces of tools 56 and 60 are configured to pull material off the walls of the troughs due to the creation of a differential pressure between the bottom surface of the tools and the wall of the trough resulting from the rotation of the tool. This pressure differential results from the air foil like design of tools 56 and 60 and tends to remove material from the walls of the container without compression and undue shear force. The design of such working tools is disclosed in my earlier patent entitled "METHOD AND APPARATUS FOR MIXING VISCOUS MATERIALS", U.S. Pat. No. 3,941,357, granted Mar. 2, 1976, the disclosure of which is herein incorporated by reference. As described in my prior patent, such tools, in a mixing apparatus which employs horizontally spaced apart, parallel, counter-rotating shafts carrying the tools, interact the material between the pair of oppositely driven shafts so that mechanical forces are applied through the working tools to move individual particles and layers of material in oblique directions, the resultant force having component forces exerted in directions circularly, laterally and toward the center of the container. The individual particles are randomly divided by means of the working tools which impart varying velocity and varying velocity paths to the particles so as to promote constant and positive circulation of all particles of the batch. The individual particles of material are radially inverted so as to change their direction, paths of travel and velocity so that the mechanical shear forces imparted by the working tools, as well as hydraulic shear forces created by the particles of material slipping on each other by their different velocities, are averaged over an extremely short period of time. The effect upon the material in hopper 12 of this action of tools 56 and 60 is to fluidize the material and promote "mass flow" of the material while rapidly unifying the bulk density of the material. The interaction of the tools and the impelling of material in an oblique direction prevents the continual delivery of material by helix 42 from only the rear of hopper 12. The action of wedge shaped working tools 56 and 60 continually co-mingles the individual particles and moves material across the entire surface of helix 42 to ensure that the flights of the helix are full with a material that has been conditioned by this action to a uniform bulk density, thus meeting the design parameters for a feeder of high volumetric accuracy as discussed above.

The action of feeder assembly 14 through the rotation of shaft 28 and helix 42 promotes a resultant force which acts to move material toward feed opening 46 and, since the shaft rotation is constant, a constant velocity is maintained on the upstream side of the feed opening. Excess material which is delivered to feed opening 46, as a result of throttling slide gate 52, is quickly returned to the interior of hopper 12 by the action of half wedge shaped working tool 64. Even with slide gate 52 fully closed, the action of working tools 56 and 60 creates forces that overcome the resultant conveying force of helix 42 so that material will not be compressed against and build up on the front wall of hopper 12.

When delivered to feed opening 46 at constant velocity, material is caused to flow through the opening to extension cylinder 44 where flow is continued by means of the helix extension therein to downspout 48. By coordination of the design of opening 46 and extension cylinder 44, the extension cylinder is only partially filled with conveyed material so that downstream conditions remain constant and the above described equation of volume flow rate being equal to the area of the opening multiplied by material velocity approximates the actual flow rate of the material. Thus, it is only necessary to vary adjustable slide gate 52 and, thus, the area of feed opening 46 to adjust the volume rate of flow of the material from hopper 12. Alternatively, it is also possible to alter the flow rate by varying the material velocity. This may be accomplished by providing a variable speed drive for feeder assembly 14 in the form of a variable speed gearmotor.

Figure 2:
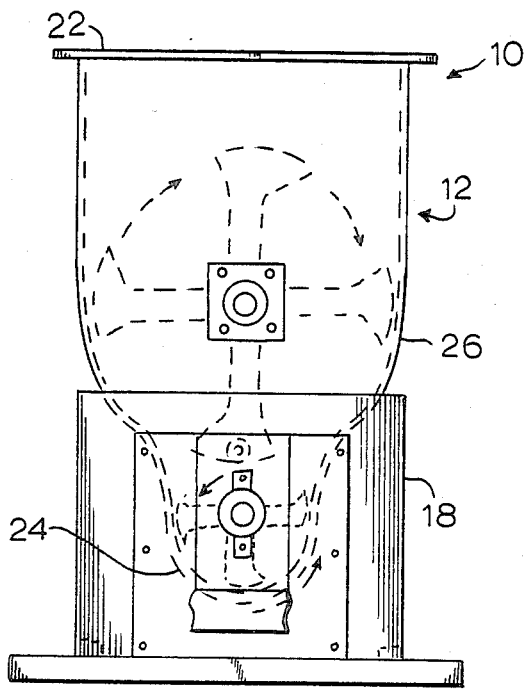
FIG. 2 is a front elevational view of the dry material feeder shown in FIG. 1.

As indicated above, the dry material feeder 10 shown and described in FIGS. 1 and 2 is suitable for the accurate volumetric feeding of materials which require some hopper agitation in order to induce flow. In addition, there are materials that are relatively more free-flowing, thus requiring only slight or mild hopper agitation to induce flow. Such materials are generally handled for feeding purposes by a material feeder which includes the combination of a helix and a so-called "overwrap". An overwrap is an additional, larger diameter helix concentric to the feed helix and mounted to the same shaft drive. In such a device, both helices will fill with material from the rear of the hopper, impose a particle-to-particle frictional condition as material is conveyed longitudinally from the rear to the front of the hopper, and also impose a pressure condition against the front hopper wall. Such conditions are ideal for bridging of the material across the helices and for promoting a non-uniform material bulk density. For such material, a material feeder according to the present invention which imparts less agitation to the material in the hopper than volumetric material feeder 10 of FIGS. 1 and 2 can be used. Such a volumetric material feeder, designated 76, is shown in FIG. 4 and comprises a hopper 78 supported on a base 80. Disposed in hopper 78 is a feeder assembly, designated 82, which is essentially identical to feeder assembly 14 of FIG. 1 and comprises a rotatable shaft 84 having mounted thereon a helix 86 and working tools 88. Hopper 74 may be constructed identically with hopper 12 of FIGS. 1 and 2 wherein a lower cylindrically shaped trough portion, designated 90, intersects an upper trough portion 92 containing the feed material. In this embodiment, the upper agitator assembly is unnecessary and is therefore eliminated in order to simplify the apparatus and make it more economical and suitable for feeding the desired material. Thus, feeder assembly 82 provides the necessary mild agitation to the material, assuring a uniform bulk density to deliver the material with volumetric and gravimetric accuracy to adjustable slide gate 94. The assembly can be arranged in hopper 78 to be directly driven by a gear motor, designated 96, which may be a variable speed motor to vary the rotational speed of feeder assembly 82.

The apparatus of the present invention, whether in the embodiments of FIG. 1 or FIG. 4, lends itself to duplex, triplex or multiplex designs wherein a plurality of material feeders are mounted on a single base plate and each separate feeder handles a different material and the various feed assemblies are all driven by the same motor through either spur gears or chains. At constant speed of the drive for the various feed assemblies, the feed rate of each component material can be individually adjusted with respect to the other component materials merely by an adjustment of the respective slide gate. With the use of a variable speed drive it is also possible to increase the feed rate of all the materials while maintaining their relative proportions. Such a multiplex arrangement driven by a single drive motor was not at all possible before the present invention since for each separate material, it was necessary to provide a different speed to the respective feeder assembly in order to proportion the feed rates for the materials. Thus, a prior art multiplex system resulted in a great deal of expense involving individual motor driven hopper units. This extremely high cost for such multiplex systems has now been overcome by the present invention.

While only two embodiments of the present invention have been shown and described, it will be obvious that many changes and modifications may be made thereunto without departing from the spirit and scope of the invention.

What is claimed is:

1. Apparatus for accurate volumetric feeding of materials which require agitation to induce flow, such as material which is slightly cohesive, of non-uniform particle size and shape, of non-uniform density, or damp material which is otherwise free flowing, said apparatus comprising:
    (a) a hopper for containing said materials including a lower horizontally disposed, cylindrically shaped trough portion intersecting an upper horizontally disposed cylindirically shaped trough portion;
    (b) an adjustable feed opening in said hopper for feeding said material from said hopper disposed at a first end of said lower cylindrically shaped trough portion;
    (c) a feeder assembly including a plurality of radially extending material working tools circumferentially mounted at equal angular displacements along a rotatable shaft and feed helix longitudinally mounted on said shaft to direct material to said feed opening in said first end of said trough portion, said working tools extending radially beyond said feed helix and said shaft of said feeder assembly being disposed longitudinally in said lower trough portion and defining the center of the cylindrical shape thereof,
    each of said material working tools comprising two substantially triangularly shaped sides converging toward each other at their conection to the shaft and converging toward each other to define a forward edge in the direction of rotation of said tool thereby defining a double edge shape, a bottom face recessed from the bottom edges of said sides and disposed so as to be adjacent to and substantially parallel to the internal surface of said cylindrically shaped lower trough portion;
    (d) an agitator assembly longitudinally disposed in said upper trough portion and comprising a plurality of radially extending material working tools circumferentially mounted at equal angular displacements along a rotatable shaft disposed parallel to the rotatble shaft of said feeder assembly, and defining the center of the cylindrical shape thereof;
    said material working tools being configured identically to the material working tools of the feeder assembly, the bottom faces of said material working tools moving in proximity to and substantially parallel to the internal surface of said upper cylindrically shaped trough portion, the tools of said feeder and agitator assemblies being mounted to their respective shaft so that the paths of travel of the tools of one shaft overlap the paths of travel of the tools of the other shaft so as to create an overlapping zone of interaction between the respective tools of said shafts, the material working tools of said agitator assembly being arranged on their respective shaft in a corresponding manner to the arrangement of the material working tools of said feeder assembly; and (e) means for rotating said shafts of said feeder and agitator assemblies counter to one another so as to fluidize the material in said hopper and establish a uniform bulk density throughout by the action of said material working tools and move said fluidized material to said feed opening by the action of said rotating helix.

2. The apparatus for accurate volumetric feeding of aterials as defined in claim 1, wherein the diameter of said upper cylindrically shaped trough portion is twice the diameter of said lower cylindrically shaped trough portion and said agitator assembly is arranged to rotate at one-half the rotational speed of said feeder assembly.

3. The apparatus for accurate volumetric feeding of materials as defined in claim 2, wherein said means for rotating said shafts comprises a single drive motor for driving said feeder assembly and a gear reduction for driving said agitator assembly at one-half the rotational speed of said feeder assembly.

4. The apparatus for accurate volumetric feeding of materials as defined in claim 1, wherein the means for rotating the shafts of said feeder and agitating assemblies is variable so that the rotational speeds of said shafts are variable.

5. The apparatus for accurate volumetric feeding of materials as defined in claim 1, comprising a plurality of hoppers each containing a separate material for feeding, each hopper containing a separate adjustable feed opening, each hopper including a separate feeder assembly, and a single means for rotating the shafts of the various feeder assemblies.

6. A method for the accurate volumetric feeding of materials which require agitation to induce flow, such as material which is slightly cohesive, of non-uniform particle size and shape, of non-uniform density, or damp material which is otherwise free flowing, said material being contained in a feed hopper having an adjustable feed opening comprising the steps of:

interacting the material with working tools mounted on a first rotatable shaft, so that mechanical forces are applied through the working tools to move individual particles and layers of material in oblique directions, the resultant force having component forces exerted in directions circularly and laterally in both directions;

interacting said material with additional working tools mounted on a second rotatable shaft disposed parallel to and vertically above said first rotatable shaft;

randomly dividing the individual material particles by means of the working tools and imparting varying velocity and velocity paths to the particles so as to promote constant positive recirculation of all particles;

radially inverting the individual particles so as to change their direction, paths of travel and velocities so that mechanical shear forces imparted by the working tools, as well as hydraulic shear forces created by the particles in the material slipping on each other by their different velocities are averaged over an extremely short period of time;

averaging and making uniform the shear stresses resulting from the mechanical and hydraulic shear forces, for each particle whereby, as a result of the uniform work input, uniform temperature gradient, uniform shear stress, a uniform and predictable viscosity and bulk density throughout the complete batch of material is provided; and moving the material by means of a helix mounted to said first rotatable shaft toward said adjustable feed opening, said working tools extending radially beyond said helix.

7. The method as defined in claim 6, wherein the speeds of rotation of said shafts are variable.

* * * * *